United States Patent
Collison et al.

(10) Patent No.: US 9,206,909 B2
(45) Date of Patent: Dec. 8, 2015

(54) ANTI-ROTATION ASSEMBLIES FOR USE WITH FLUID VALVES

(75) Inventors: Randall Scott Collison, Bondurant, IA (US); Chad Michael Engle, Marshalltown, IA (US); Christine Rae Hodny, Aberdeen, SD (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 282 days.

(21) Appl. No.: 13/362,750

(22) Filed: Jan. 31, 2012

(65) Prior Publication Data

US 2013/0193356 A1    Aug. 1, 2013

(51) Int. Cl.
| | |
|---|---|
| F16K 31/44 | (2006.01) |
| F16K 1/44 | (2006.01) |
| F16K 3/26 | (2006.01) |
| F16K 1/50 | (2006.01) |
| F16K 41/10 | (2006.01) |
| F16K 31/50 | (2006.01) |

(52) U.S. Cl.
CPC . *F16K 1/50* (2013.01); *F16K 41/10* (2013.01); *F16K 31/508* (2013.01); *Y10T 137/86775* (2015.04); *Y10T 137/86799* (2015.04)

(58) Field of Classification Search
CPC ....... F16K 31/508; F16K 41/10; F16K 1/123; F16K 47/08; F16K 1/50; E21B 34/02; Y10T 137/86791; Y10T 137/86799; Y10T 137/86778; Y10T 137/86718; Y10T 137/86787
USPC ........... 251/318, 266, 335.1–335.3, 281–283, 251/63.5, 63.6, 122, 144, 264, 265, 274, 251/332–334, 356–358, 267–269; 137/510, 137/625.12, 625.16, 625.37, 625.39, 137/625.35, 625.38
See application file for complete search history.

(56) References Cited

U.S. PATENT DOCUMENTS

| | | | | |
|---|---|---|---|---|
| 984,243 | A * | 2/1911 | Schmid et al. | 251/189 |
| 1,001,970 | A * | 8/1911 | McCarthy | 251/191 |
| 1,728,077 | A * | 9/1929 | Moyer | 251/191 |
| 2,078,553 | A * | 4/1937 | Allen et al. | 222/5 |
| 2,132,199 | A * | 10/1938 | Yancey | 166/76.1 |
| 3,206,165 | A | 9/1965 | Salmon et al. | |

(Continued)

FOREIGN PATENT DOCUMENTS

| | | |
|---|---|---|
| DE | 1019878 | 3/1955 |
| DE | 102009008493 A1 | 8/2010 |

(Continued)

OTHER PUBLICATIONS

Fisher, "Type SS-114 Control Valve," Instruction Manual, Feb. 1997, 8 pages.

(Continued)

*Primary Examiner* — John K Fristoe, Jr.
*Assistant Examiner* — Hailey K Do
(74) *Attorney, Agent, or Firm* — Hanley, Flight & Zimmerman, LLC

(57) ABSTRACT

Anti-rotational assemblies for use with fluid valves are disclosed herein. An example anti-rotation assembly includes an anti-rotation retainer to couple to a flow control member of a valve and an anti-rotator to engage the anti-rotation retainer. The anti-rotator prevents rotation of the anti-rotation retainer relative to a longitudinal axis of the anti-rotation retainer when the anti-rotation retainer is disposed in the valve.

29 Claims, 4 Drawing Sheets

(56) References Cited

U.S. PATENT DOCUMENTS

| | | | |
|---|---|---|---|
| 3,892,384 A | 7/1975 | Myers | |
| 3,934,814 A * | 1/1976 | Orszak | 251/80 |
| 4,054,979 A | 10/1977 | Massey, Jr. | |
| 4,346,728 A * | 8/1982 | Sulzer | 137/243.6 |
| 4,383,553 A * | 5/1983 | Platt | 138/46 |
| 4,483,512 A * | 11/1984 | Drapeau | 251/265 |
| 4,523,436 A * | 6/1985 | Schedel et al. | 62/222 |
| 4,616,804 A * | 10/1986 | Sano et al. | 251/267 |
| 4,671,490 A * | 6/1987 | Kolenc et al. | 251/335.2 |
| 4,763,690 A * | 8/1988 | Martin | 137/613 |
| 4,834,133 A * | 5/1989 | LaCoste et al. | 137/315.11 |
| 5,074,519 A * | 12/1991 | Pettus | 251/14 |
| 5,706,856 A * | 1/1998 | Lancaster | 137/556.3 |
| 5,722,638 A * | 3/1998 | Miller et al. | 251/335.2 |
| 5,820,106 A * | 10/1998 | Wurangian | 251/326 |
| 7,216,844 B2 * | 5/2007 | Malina et al. | 251/214 |
| 8,267,372 B2 * | 9/2012 | Masamura | 251/93 |
| 2003/0024580 A1 * | 2/2003 | Bohaychuk | 137/625.37 |
| 2006/0049375 A1 | 3/2006 | Gossett | |
| 2012/0012772 A1 * | 1/2012 | Moore et al. | 251/318 |

FOREIGN PATENT DOCUMENTS

| | | |
|---|---|---|
| EP | 0134866 A2 | 3/1985 |
| GB | 1236631 | 6/1971 |
| GB | 2256028 A | 11/1992 |

OTHER PUBLICATIONS

International Searching Authority, "Search Report" issued in connection with International Patent Application No. PCT/US2013/023063, mailed on Jun. 5, 2013, 3 pages.

International Searching Authority, "Written Opinion" issued in connection with International Patent Application No. PCT/US2013/023063, mailed on Jun. 5, 2013, 7 pages.

International Searching Authority, "International Preliminary Report on Patentability" issued in connection with International Patent Application No. PCT/US2013/023063, issued Aug. 5, 2014, 8 pages.

* cited by examiner

ANTI-ROTATION ASSEMBLIES FOR USE WITH FLUID VALVES

FIELD OF THE DISCLOSURE

This patent relates generally to fluid valves and, more particularly, to anti-rotation assemblies for use with fluid valves.

BACKGROUND

Process control systems use a variety of field devices to control and/or monitor process parameters. Field devices, such as fluid control valves, control the flow of fluid through a passageway of a valve. A control valve typically employs an actuator to move a flow control member relative to an orifice of the valve to allow fluid flow through the passageway of the valve and to restrict or prevent fluid flow through the passageway of the valve. The actuator is operatively coupled to the flow control member via a valve stem.

Some process control devices often include seals to prevent fluid leakage. For example, some known fluid valves employ a bellows-type seal to prevent fluid leakage to the environment along the valve stem. However, the seals (e.g., bellows seals) are often subjected to stresses during operation that can significantly reduce the operating life of the seal. For example, fluid flowing through the passageway of the valve body may impart torsion loads to a bellows-type seal. Such torsion loads may significantly reduce the cycle life of the bellows-type seal.

SUMMARY

An example anti-rotation assembly includes an anti-rotation retainer to couple to a flow control member of a valve and an anti-rotator to engage the anti-rotation retainer. The anti-rotator prevents rotation of the anti-rotation retainer relative to a longitudinal axis of the anti-rotation retainer when the anti-rotation retainer is disposed in the valve.

Another example anti-rotation assembly includes an anti-rotation retainer having an opening to receive at least a portion of a balanced valve plug and an outer surface defining a first engaging surface. An anti-rotator has a central opening defining an inner surface where the inner surface has a second engaging surface. The first engaging surface is complementary to the second engaging surface such that the first engaging surface engages the second engaging surface when the anti-rotation retainer is coupled to the anti-rotator to prevent rotation of the anti-rotation retainer relative to the anti-rotator.

DETAILED DESCRIPTION

Example anti-rotation assemblies disclosed herein significantly reduce or prevent twisting rotation of a valve stem and/or a flow control member relative to a valve body of a fluid valve. As a result, the anti-rotation assemblies disclosed herein may be used to prevent or significantly reduce torsional loads imparted to a bellows-type seal. For example, the anti-rotation assemblies disclosed herein significantly prevent a process fluid (e.g., a relatively high pressure process fluid) flowing through a passageway of a valve from twisting or turning a flow control member and/or a valve stem relative to a longitudinal axis of the flow control member when the flow control member is positioned away from a valve seat of the fluid valve. Limiting rotation of the valve stem and/or the flow control member significantly extends an operating life of a bellows-type seal.

Additionally or alternatively, the example anti-rotation assemblies disclosed herein enable use of a balanced flow control member. In particular, the anti-rotation assemblies disclosed herein define a seal gland to receive a seal that prevents fluid flow or leakage between the flow control member and a cage and/or a valve body when the flow control member is in a closed position. A balanced flow control member requires less thrust to move between an open position and a closed position. As a result, a relatively smaller actuator may be employed.

An example anti-rotation assembly disclosed herein includes an anti-rotation retainer and an anti-rotator. The anti-rotation retainer is coupled (e.g., fixed) to a flow control member. The anti-rotation retainer includes an opening to receive at least a portion of a flow control member or valve plug (e.g., a balanced valve plug) and an outer surface defining a first engaging surface or keyed portion. Also, at least a portion of the anti-rotator also includes an engaging surface or keyed portion. The engaging surface or keyed portion of the anti-rotator is complementary to the engaging surface or keyed portion of the anti-rotation retainer to provide a substantially tight fit connection between the anti-rotator and the anti-rotation retainer when the anti-rotator is coupled to the anti-rotation retainer.

When coupled to a fluid valve, the anti-rotator engages the anti-rotation retainer to prevent the anti-rotation retainer and, thus, the flow control member from rotating or twisting relative to a longitudinal axis of the anti-rotation retainer and/or the flow control member. In some examples, the engaging surface of the anti-rotation retainer may be formed along a portion of an outer surface of the anti-rotation retainer and the engaging surface of the anti-rotator may be formed along a portion of an inner surface of the anti-rotator. The respective engaging surfaces of the anti-rotator and the anti-rotation retainer may be one or more substantially flat-shaped or straight surfaces.

Figure 1:
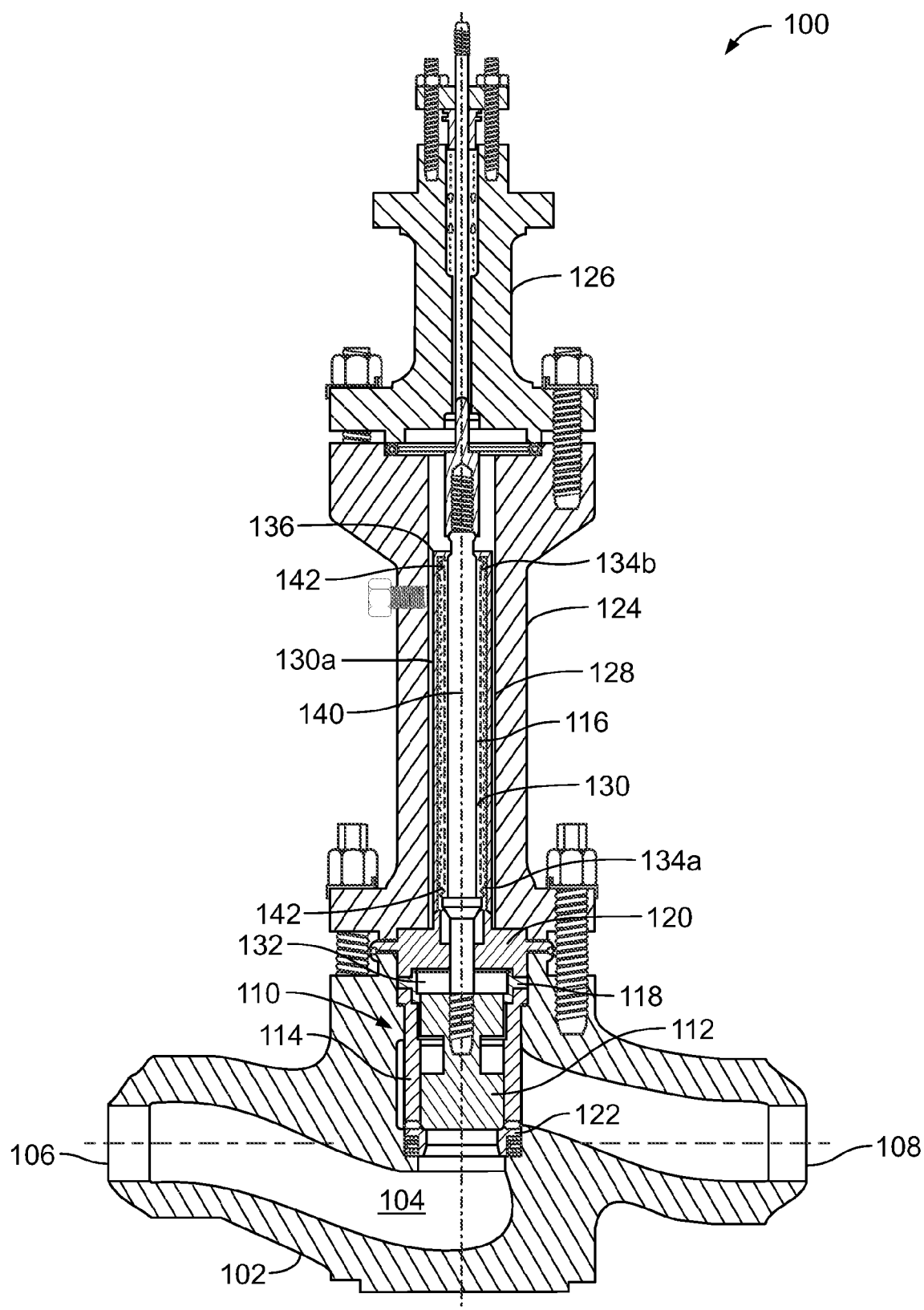
FIG. 1 is a cross-sectional view of a known fluid valve.

Before discussing an example anti-rotation assembly disclosed herein, a brief description of a known fluid valve 100 is provided in FIG. 1. The fluid valve 100 of FIG. 1 includes a valve body 102 defining a fluid flow passageway 104 between an inlet 106 and an outlet 108. A flow control assembly 110 controls fluid flow through the passageway 104. As shown in FIG. 1, the flow control assembly 110 includes a valve plug 112, a cage 114, a valve stem 116, an anti-rotator 118, and a bellows seal flange 120.

The valve plug 112 is operatively coupled to the valve stem 116 and moves in a first direction away from a valve seat 122 to allow fluid flow through the passageway 104 and moves in a second direction toward the valve seat 122 to restrict or prevent fluid flow through the passageway 104. The valve plug 112 of FIG. 1 is an unbalanced valve plug. Thus, a relatively large actuator may be required to move the valve plug 112 to a closed position and/or provide sufficient thrust to the valve plug 112 to provide a relatively tight seal when valve plug 112 sealingly engages the valve seat 122 in a closed position. A bonnet extension 124 couples the valve body 102 to a bonnet 126, which couples the valve body 102 to an actuator (not shown).

In FIG. 1, the bonnet extension 124 includes an aperture 128 to slidably receive the valve stem 116. In addition, a bellows seal 130 is disposed within the aperture 128 of the bonnet extension 124 to prevent fluid in a chamber 132 of the valve body 102 from leaking to the environment along the valve stem 116. As shown, the bellows seal 130 has a first end 134a coupled to the bellows seal flange 120 and a second end 134b coupled to an upper portion or connector 136 of a bellows tubing 130a. The connector 136 is coupled to the bellows tubing 130a via, for example, welding, and includes a central aperture to slidably receive the valve stem 116. The bellows tubing 130a is coupled to the bellows flange 120 via, for example, welding.

In operation, an actuator (not shown) moves the valve plug 112 relative to the valve seat 122 in a rectilinear motion along a longitudinal axis 140 to control the fluid flow through the passageway 104. In addition, the bellows seal 130 compresses and expands axially in a direction along the longitudinal axis 140 when the valve stem 116 moves between a first position at which the valve plug 112 sealingly engages the valve seat 122 and a second position at which the valve plug 112 is away from the valve seat 122 (e.g., an open position). Thus, during each operational cycle, the bellows seal 130 is subjected to a load (e.g., an axial load) and, thus, a stress which affects the cycle-life and/or useful life of the bellows seal 130.

The bellows seal 130 has one or more convolutions 142 that axially compress or expand along the longitudinal axis 140 depending upon the movement of valve stem 116. To form the convolutions 142, the bellows seal 130 is formed or stamped from rolling a flat sheet or foil into a tube which is then longitudinally fusion welded. Alternatively, the seal 130 may be formed by welding washer-like plates of thin metal together at both the inner and outer circumference of the washers. The welded portions of the convolutions are susceptible to damage when torsional loads (e.g., relatively large torsional loads or forces) are imparted to the bellows seal 130. In some examples, the torsional loads may cause the bellows seal 130 to fail prior to a rated cycle-life of the bellows seal 130 (e.g., an operating life of a bellows seal that is not subjected to torsional loads).

For example, during operation, a relatively high pressure process fluid may impart a torsional load on the valve plug 112 when the valve plug 112 is away from the valve seat 122. Because the valve stem 116 is fixedly coupled to the valve plug 112 at the first end 134a, the torsion load imparted to the valve plug 112 causes the valve stem 116 to twist or turn relative to the longitudinal axis 140. In turn, the first end 134a between the bellows seal 130 and the valve stem 116 causes the bellows seal 130 to experience a torsional load. During operation, the anti-rotator 118 reduces rotational movement of the valve plug 112 relative to the longitudinal axis 140, which reduces such twisting of the bellows seal 130. However, as noted above, the valve plug 112 is an unbalanced valve plug. Employing a balanced valve plug in combination with the anti-rotator 118 of FIG. 1 may affect (e.g., reduce) a shut-off classification of the fluid valve 100 because fluid leakage may occur between the cage 114 and the valve plug 112 when the valve plug 112 is sealingly engaged with the valve seat 122 (e.g., in a closed position).

Figure 2:
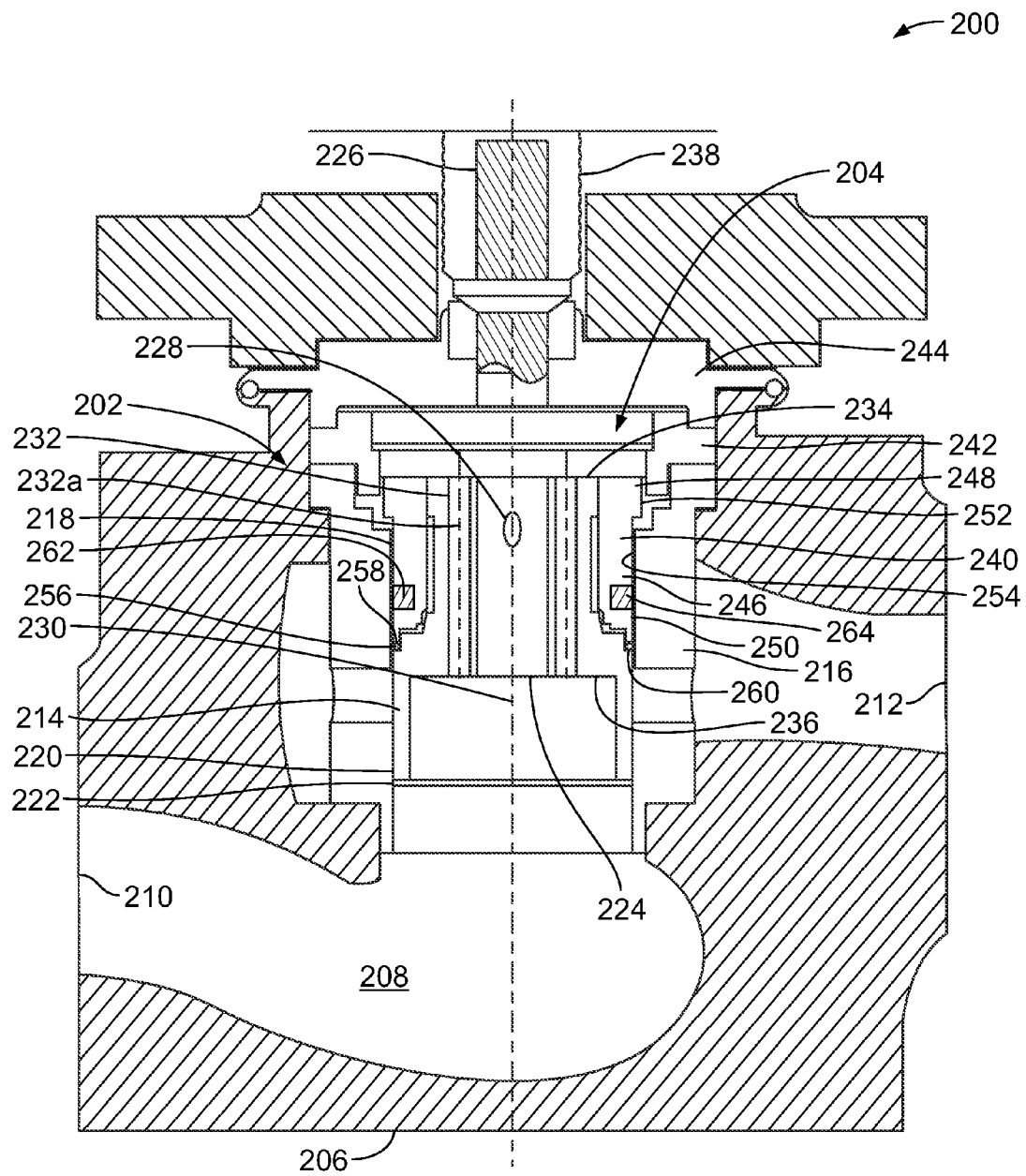
FIG. 2 is a cross-sectional view of an anti-rotation retainer assembly that may be used with the fluid valve of FIG. 1.

FIG. 2 is a cross-sectional view of an example fluid valve 200 having a flow control assembly 202 that includes an example anti-rotation assembly 204 in accordance with the teachings disclosed herein. For example, the flow control assembly 202 and/or the anti-rotation assembly 204 may replace the flow control assembly 110 of FIG. 1 and/or may retrofit a fluid valve in the field such as, for example, the fluid valve 100 of FIG. 1.

Referring to FIG. 2, the fluid valve 200 includes a valve body 206 defining a fluid flow passageway 208 between an inlet 210 and an outlet 212. The flow control assembly 202 is disposed within the passageway 208 to control fluid flow through the passageway 208 between the inlet 210 and the outlet 212. The flow control assembly 202 of FIG. 2 includes a flow control member 214 (e.g., a valve plug), a cage 216 and the anti-rotation assembly 204. More specifically, the cage 216 includes an opening 218 to slidably receive at least a portion of the flow control member 214 and is disposed between the inlet 210 and the outlet 212 to impart certain flow characteristics to the fluid flowing through the passageway 208 (e.g., to control capacity, reduce noise, reduce cavitation, etc.).

As shown in FIG. 2, the flow control member 214 includes a sealing surface 220 that engages a valve seat 222 integrally formed with the cage 216 when the flow control member 214 sealingly engages the valve seat 222 (e.g., a closed position). Thus, the flow rate permitted through the fluid valve 200 is controlled by the position of the flow control member 214 relative to the valve seat 222.

The flow control member 214 is a balanced flow control member and includes a central opening 224 to receive (e.g., threadably receive) a valve stem 226. To further prevent rotation of the flow control member 214 relative to the valve stem 226, the flow control member 214 includes an opening 228 to receive a fastener or pin (not shown). To balance the flow control member 214, a plurality of through passageways 232 is formed between an upper surface 234 and a lower surface 236 of the flow control member 214. Each of the passageways 232 includes an axis 232a that is substantially parallel to a longitudinal axis 230 of the flow control member 214 and enables fluid flow between the lower and upper surfaces 234 and 236 of the flow control member 214. As a result of the balanced flow control member 214 and in contrast to the fluid valve 100 of FIG. 1, a relatively smaller actuator providing less thrust may be employed to move the flow control member 214 between an open position and a closed position and/or to move the flow control member 214 into sealing engagement with the valve seat 222 to prevent or restrict fluid flow through the passageway 208. The fluid valve 200 of FIG. 2 also includes a bellows seal 238 that surrounds the valve stem 226 to prevent leakage of process fluid to the environment along the valve stem 226.

The anti-rotation assembly 204 is disposed in the passageway 208 of the valve body 206. The example anti-rotation assembly 204 includes an anti-rotation retainer, insert or guide 240 and an anti-rotator 242. The anti-rotation retainer 240 of FIG. 2 is at least partially disposed in the opening 218 of the cage 216 and the anti-rotator 242 is disposed or captured between the cage 216 and a bellows seal flange 244. In other examples, the cage 216 may be omitted such that the anti-rotator 242 is disposed or captured between the bellows seal flange 244 and the valve body 206. The bellows seal 238 is coupled to the valve stem 226 at a first end and is coupled to a connector such as, for example, the connector 136 of FIG. 1 at a second end of the bellows seal 238 opposite the first end. The anti-rotation assembly 204 prevents or significantly reduces torsional loads from being imparted to the bellows seal 238.

The anti-rotation retainer 240 of the illustrated example includes a first portion or body 246 (e.g., a cylindrical body) and a second portion or flange 248. The body 246 defines a first outer surface portion 250 of the anti-rotation retainer 240 and the flange 248 defines a second outer surface portion 252 of the anti-rotation retainer 240. As shown in FIG. 2, a diameter or size of the flange 248 is greater than a diameter of the body 246. More specifically, the body 246 is at least partially disposed in the opening 218 of the cage 216 and/or slides relative to an inner surface 254 of the opening 218 of cage 216.

As shown in FIG. 2, an end or edge 256 of the body 246 of the anti-rotation retainer 240, the cage 216 and the flow control member 214 define a gland or cavity 258 to receive a seal 260 (e.g., a C-seal) that prevents fluid leakage between the anti-rotation retainer 240 and the cage 216 when the flow control member 214 is in sealing engagement with the valve seat 222. In other examples, however, the body 246 of the anti-rotation retainer 240 and/or the flange 248 may include a groove or channel (e.g., an annular gland) to receive the seal 260. Additionally or alternatively, the outer surface portion 250 defined by the body 246 of the anti-rotation retainer 240 includes an annular gland 262 to receive a piston ring 264 (e.g., a carbon-graphite piston ring) to help maintain alignment of the anti-rotation retainer 240 relative to the cage 216 and/or helps to provide a seal between the anti-rotation retainer 240 and the cage 216. In some examples, the annular gland 262 may receive a seal (e.g., a C-seal).

Figure 3A:
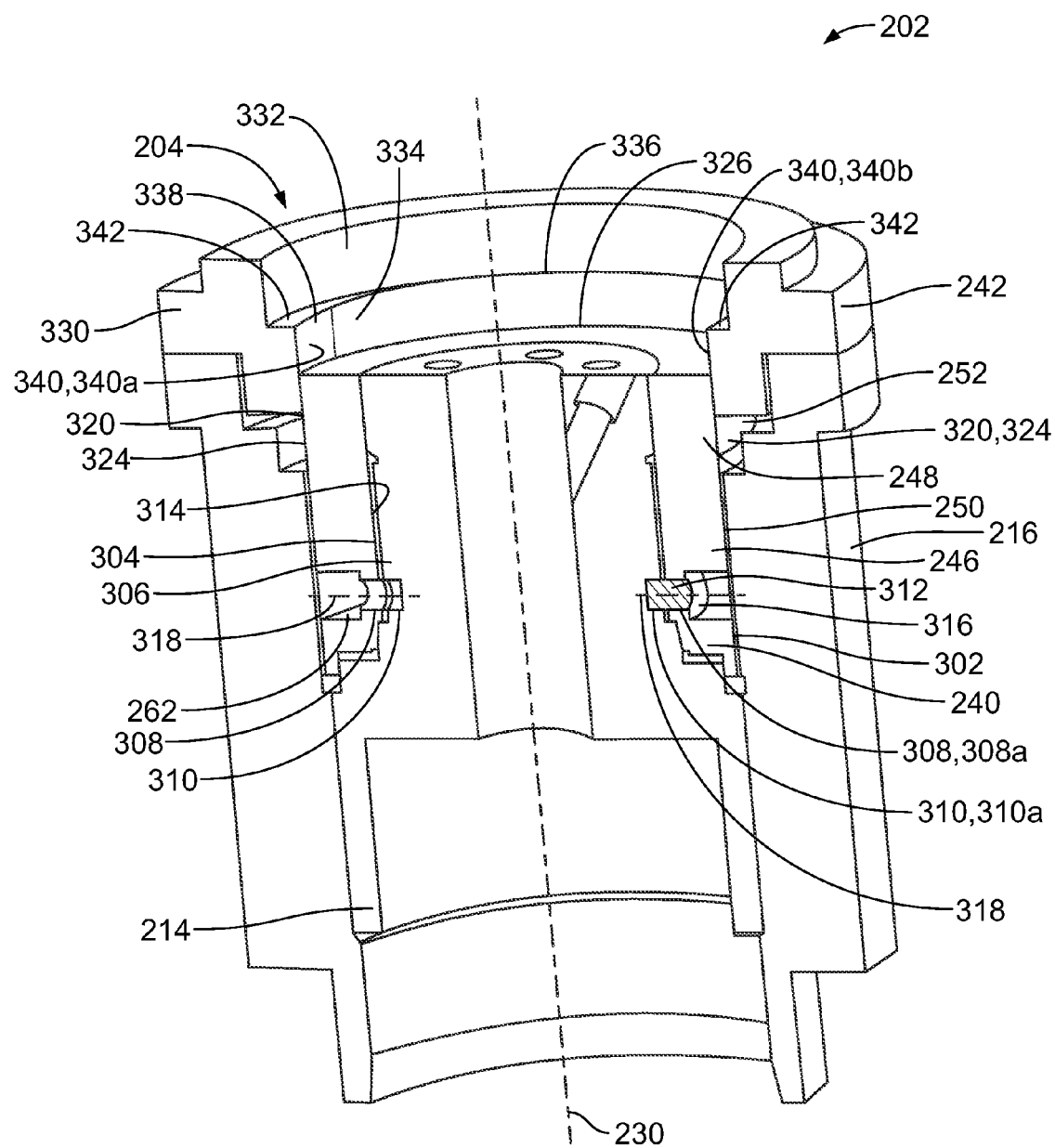
FIG. 3A is a cross-sectional, perspective view of the example anti-rotation assembly of FIG. 2.
Figure 3B:
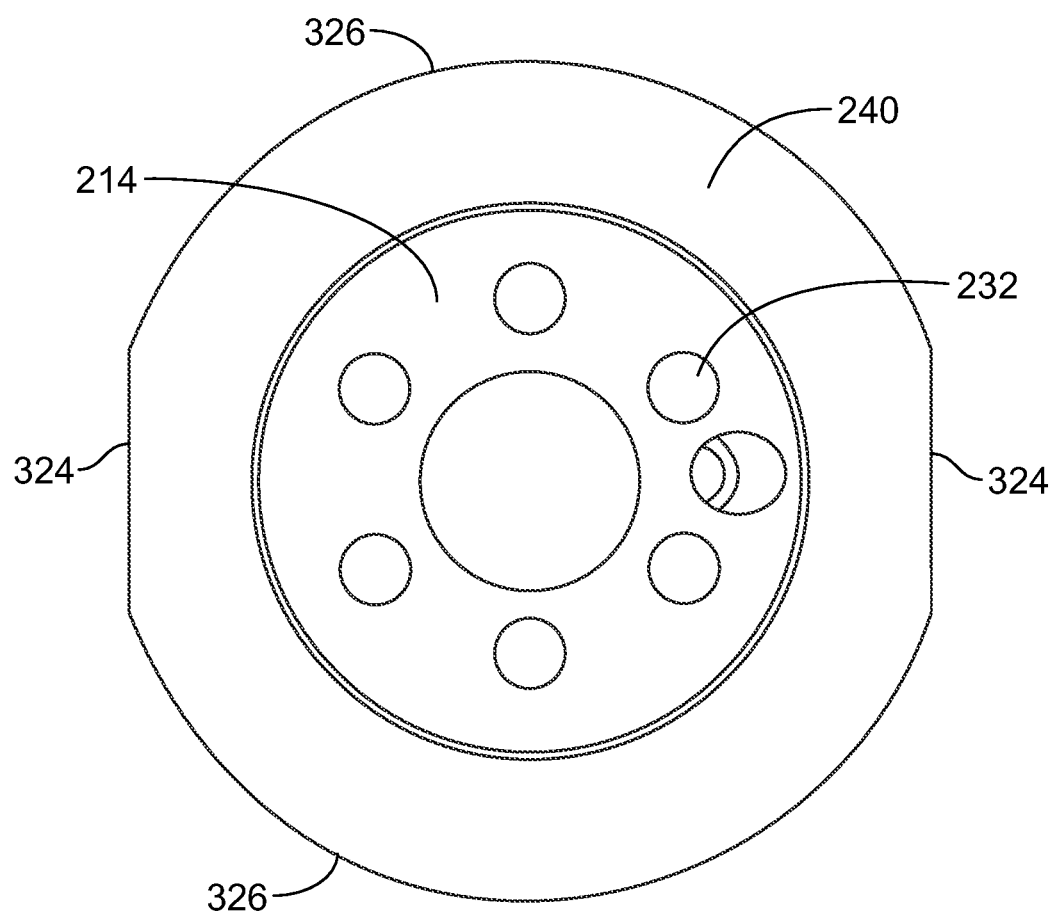
FIG. 3B is a plan view of the example anti-rotation assembly of FIGS. 2 and 3A.

FIG. 3A is a cross-sectional perspective view of the anti-rotation assembly 204 of FIG. 2. FIG. 3B is a plan view of the anti-rotation retainer 240 coupled to the flow control member 214. Referring to FIGS. 3A and 3B, the anti-rotation retainer 240 is a cylindrical body 302 having a central opening 304 that is sized or configured to receive at least a portion 306 (e.g., a stem portion) of the flow control member 214. In addition, the flow control member 214 is fixedly coupled to the anti-rotation retainer 240. As shown in FIG. 3, the anti-rotation retainer 240 includes one or more openings 308 that align with respective openings 310 of the flow control member 214. An opening 308a of the anti-rotation retainer 240 and an opening 310a of the flow control member 214 receive a pin 312 to couple (e.g., fixedly couple) the anti-rotation retainer 240 and the flow control member 214 such that the flow control member 214 cannot move (e.g., rotate or slide) relative to the anti-rotation retainer 240. The openings 308 of the anti-rotation retainer 240 are formed between an inner surface 314 of the body 246 and an annular surface 316 that is formed or defined by the annular gland 262 of the body 246. In this example, the openings 308 and 310 include respective axes 318 that are substantially perpendicular to the longitudinal axis 230. In other examples, however, the respective axes 318 of the openings 308 and 310 may be at any angle and/or non-parallel orientation relative to the longitudinal axis 230. Thus, the valve stem 226, the flow control member 214 and the anti-rotation retainer 240 are fixedly coupled to function as a unitary unit or assembly.

In the illustrated example, the anti-rotation retainer 240 defines an engaging surface or keyed portion 320 of the anti-rotation retainer 240. The engaging surface or keyed portion 320 is formed along at least a portion of the outer surfaces 250 and/or 252 of the anti-rotation retainer 240. In particular, the engaging surface 320 as shown in FIG. 3 is disposed or formed in proximity to or adjacent an outer peripheral edge of the flange 248. More specifically, the engaging surface 320 of the illustrated example includes one or more substantially flat-shaped or straight portions or surfaces 324. As most clearly shown in FIG. 3B, the substantially flat-shaped portions 324 are disposed between arcuate or curved surfaces 326 of the anti-rotation retainer 240 or the flange 248. For example, the anti-rotation retainer 240 may be formed as a cylindrical body and the substantially flat-shaped portions 324 may be formed subsequently via, for example, machining.

The anti-rotator 242 is a cylindrical body 330 having a central opening 332. In particular, the central opening 332 defines an inner surface 334 having at least a stepped portion 336. Similar to the anti-rotation retainer 240, the anti-rotator 242 includes an engaging surface or keyed portion 338. More specifically, engaging surface 338 is formed along at least a portion of the inner surface 334 of the anti-rotator 242. In the illustrated example, the engaging surface 338 of the anti-rotator 242 includes one or more substantially flat-shaped or straight surfaces or portions 340. As shown in FIG. 3A, the one or more substantially flat-shaped portions 340 of the anti-rotator includes a wall or projection 342 formed on the inner surface 334 that projects toward the longitudinal axis 230 where the wall 342 defines the substantially flat-shaped portion 340. In this example, the anti-rotator 242 includes two substantially flat-shaped portions 340a and 340b radially spaced approximately 180 degrees relative to the longitudinal axis 230. However, in other examples, the anti-rotator 242 may include only one substantially flat-shaped portion 340 or engaging surface 338 and/or more than two flat-shaped portions 340 or engaging surfaces 338 disposed on the inner surface 334 of the anti-rotator 242. As shown, the engaging surfaces 338 and/or walls 342 are formed between arcuate or curved surfaces 344 of the inner surface 334 of the anti-rotator 242.

The engaging surface 320 of the anti-rotation retainer 240 engages or contacts (e.g., directly contacts) the engaging surface 338 of the anti-rotator 242. In the illustrated example, both the substantially flat-shaped surfaces 324 and 340 of the respective anti-rotation retainer 240 and the anti-rotator 242 have faces or planes that are substantially parallel to the longitudinal axis 230. In addition, the anti-rotation retainer 240 can slide relative to the anti-rotator 242 when the flow control member 214 moves relative to the valve seat 222 between the open position and the closed position. In other examples, the engaging surfaces 320 and 338 of the respective anti-rotation retainer 240 and the anti-rotator 242 may have different shapes or configurations other than the substantially flat-shaped surfaces 324 and 340 described in FIGS. 3 and 4. For example, the wall 342 may include a track and/or a slot that engages or slides relative to a complementary slot and/or track formed on the flange 248 of the anti-rotation retainer 240 (e.g., a tongue-and-groove connection). In yet other examples, the engaging surface 320 of the anti-rotation retainer 240 and the engaging surface 338 of the anti-rotator 242 may be a splined connection. For example, the engaging surfaces 320 and 338 may include splines that extend along an entire circumference or perimeter of the anti-rotation retainer 240 and the anti-rotator 242.

In operation, when coupled to the anti-rotation retainer 240, the anti-rotator 242 prevents rotation of the anti-rotation retainer 242 and, thus, the flow control member 214 relative to the longitudinal axis 230 (i.e., the anti-rotation retainer 240 and/or the cage 216). In particular, the engaging surface 320 of the anti-rotation retainer 240 is complementary to the engaging surface 338 of the anti-rotator 242 to provide a substantially tight fit connection between the anti-rotator 242 and the anti-rotation retainer 240. More specifically, the substantially flat-shaped portions 324 and 340 of the respective anti-rotation retainer 240 and the anti-rotator 242 engage to prevent rotation of the anti-rotation retainer 240 relative to the longitudinal axis 230 when the anti-rotation retainer 240 is disposed within the fluid valve 200. Thus, the flow control member 214, via the anti-rotation assembly 204, prevents twisting or torsional loads applied to the flow control member 214 from being conveyed to the bellows seal 238, thereby increasing the operating life of the bellows seal 238.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed:

1. An anti-rotation assembly for use with a valve, the anti-rotation assembly comprising:
   a cage to be disposed inside a valve body, the cage defining a first aperture having a substantially circular cross-section;
   a plug disposed within the first aperture of the cage throughout a stroke of the valve, an interaction between the plug and the first aperture to guide movement of the plug throughout the stroke of the valve, the plug having a substantially circular cross-section;
   an anti-rotation retainer coupled to the plug, the anti-rotation retainer having an exterior surface defining a non-circular cross-section and an interior surface at least partially surrounding the plug;
   an anti-rotator coupled to an end of the cage, the anti-rotator defining a second aperture having a non-circular cross-section, an engagement between the anti-rotator and the exterior surface to reduce rotation of the anti-rotation retainer and the plug relative to a longitudinal axis of the anti-rotation retainer;
   a seal coupled to at least one of the plug or the anti-rotation retainer, the seal to sealingly engage the cage to substantially prevent fluid flow between the seal and the cage; and
   a transverse bore extending through the anti-rotation retainer and the plug, a fastener to be disposed in the transverse bore to couple the plug and the anti-rotation retainer, the anti-rotation retainer defining an opening of the transverse bore, wherein the anti-rotation retainer defines a groove into which the seal is disposed, wherein the transverse bore intersects the groove at the opening of the transverse bore.

2. An anti-rotation assembly of claim 1, wherein the anti-rotator comprises two substantially flat-shaped portions radially spaced approximately 180 degrees relative to the longitudinal axis.

3. An anti-rotation assembly of claim 1, wherein the anti-rotation retainer comprises a central opening to receive at least a portion of the plug.

4. An anti-rotation assembly of claim 1, wherein the cage is to slidably receive at least a portion of the anti-rotation retainer.

5. An anti-rotation assembly of claim 1, wherein an interaction between the seal and the groove is to retain the seal relative to the anti-rotation retainer and the plug.

6. An anti-rotation assembly of claim 1, wherein the seal is disposed at an interface between the anti-rotation retainer and the plug.

7. The anti-rotation assembly of claim 1, further comprising a valve body defining a flow aperture, wherein the cage is disposed within the flow aperture, the plug is movable relative to the flow aperture to control fluid flow through the valve, the anti-rotation retainer is directly coupled to the plug and the anti-rotator is directly coupled to the cage, and the seal is disposed between at least one of the cage and the anti-rotation retainer or the anti-rotator.

8. The anti-rotation assembly of claim 1, wherein the seal surrounds a collar of the plug, the seal disposed at an interface between the plug and the anti-rotation retainer.

9. The anti-rotation assembly of claim 1, wherein the seal is to be loaded into engagement with an inner surface of the cage to substantially prevent fluid flow between at least one of the plug or the anti-rotation retainer and the cage.

10. The anti-rotation assembly of claim 1, wherein the plug comprises a balanced plug.

11. The anti-rotation assembly of claim 1, wherein the seal includes a first seal, further comprising a second seal coupled to the plug or the anti-rotation retainer to substantially prevent fluid flow between the second seal and the cage.

12. The anti-rotation assembly of claim 1, wherein a portion of the plug defining the transverse bore comprises a blind hole.

13. The anti-rotation assembly of claim 1, wherein the seal is to cover the opening of the transverse bore.

14. The anti-rotation assembly of claim 1, further comprising a stem to be coupled within an aperture of the plug.

15. The anti-rotation assembly of claim 1, further comprising a second transverse bore extending through the anti-rotation retainer and the plug, a second fastener to be disposed in the second transverse bore to couple the plug and the anti-rotation retainer, the anti-rotation retainer defining an opening of the second transverse bore.

16. The anti-rotation assembly of claim 15, wherein the first and second transverse bores are disposed along a transverse axis of the anti-rotation retainer.

17. The anti-rotation assembly of claim 1, wherein the exterior surface of the anti-rotation retainer defines a first keyed surface, the second aperture of the anti-rotator defines a second keyed surface, the anti-rotator to be disposed within the valve, the anti-rotator to receive the plug and the anti-rotation retainer, the first keyed surface to engage the second keyed surface to reduce rotation of the anti-rotation retainer relative to the anti-rotator, and the seal surrounds the plug, the seal being disposed at an interface between the plug and the anti-rotation retainer.

18. An anti-rotation assembly of claim 17, wherein the first keyed surface comprises one or more substantially flat-shaped surfaces disposed along a portion of the exterior surface of the anti-rotation retainer and the second keyed surface comprises one or more substantially flat-shaped surfaces formed along a portion of an inner surface of the anti-rotator.

19. An anti-rotation assembly of claim 17, wherein the fastener includes a pin, the pin to cause the anti-rotation retainer to move with the plug throughout a stroke of the valve.

20. An anti-rotation assembly of claim 19, wherein the first aperture of the cage is to slidably guide the anti-rotation retainer and the plug, an interaction between the seal and the cage to substantially prevent fluid flow between the seal and the cage.

21. An anti-rotation assembly of claim 1, wherein the anti-rotator comprises a first engaging surface to engage a second engaging surface of the exterior surface of the anti-rotation retainer.

22. An anti-rotation assembly of claim 21, wherein the first engaging surface of the anti-rotator is complementary to the second engaging surface of the anti-rotation retainer.

23. An anti-rotation assembly of claim 21, wherein the first engaging surface is formed along at least a portion of the interior surface of the anti-rotator and the second engaging surface is formed along at least a portion of the exterior surface of the anti-rotation retainer.

24. An anti-rotation assembly of claim 23, wherein the anti-rotation retainer comprises a cylindrical body and a flange, the flange defining the second engaging surface and the body defining an outer surface portion adjacent the flange.

25. An anti-rotation assembly of claim 24, wherein the second engaging surface of the anti-rotation retainer has a diameter that is greater than a diameter of the outer surface portion.

26. An anti-rotation assembly of claim 23, wherein each of the first engaging surface and the second engaging surface comprises a substantially flat-shaped portion.

27. An anti-rotation assembly of claim 26, wherein the substantially flat-shaped portion of the anti-rotation retainer is disposed between arcuate surfaces.

28. An anti-rotation assembly of claim 26, wherein the anti-rotator comprises a cylindrical body having the second aperture that defines the interior surface, the interior surface having the substantially flat-shaped portion.

29. An anti-rotation assembly of claim 28, wherein the substantially flat-shaped portion of the anti-rotator comprises a wall projecting toward the longitudinal axis, the wall defining the substantially flat-shaped portion.

\* \* \* \* \*